United States Patent
Onde et al.

(10) Patent No.: US 10,162,701 B2
(45) Date of Patent: Dec. 25, 2018

(54) MCU WITH PROCESSOR-INDEPENDENT MEMORY FAULT DETECTION

(71) Applicant: STMicroelectronics (Rousset) SAS, Rousset (FR)

(72) Inventors: Vincent Onde, Rousset (FR); Dragos Davidescu, Lambesc (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 15/888,624

(22) Filed: Feb. 5, 2018

(65) Prior Publication Data

US 2018/0157556 A1 Jun. 7, 2018

Related U.S. Application Data

(63) Continuation of application No. 13/536,712, filed on Jun. 28, 2012.

(30) Foreign Application Priority Data

Jun. 28, 2011 (FR) ...................................... 11 55727

(51) Int. Cl.
*G06F 11/10* (2006.01)

(52) U.S. Cl.
CPC ................................ *G06F 11/1048* (2013.01)

(58) Field of Classification Search
CPC .................................................. G06F 11/1048
See application file for complete search history.

(56) References Cited

U.S. PATENT DOCUMENTS

| | | | |
|---|---|---|---|
| 4,211,997 A | 7/1980 | Rudnick et al. | |
| 5,915,082 A | 6/1999 | Marshall et al. | |
| 6,003,146 A * | 12/1999 | Beutler ............... | H03M 13/091 714/701 |
| 6,012,148 A | 1/2000 | Laberge et al. | |
| 6,092,231 A | 7/2000 | Sze | |
| 6,802,039 B1 | 10/2004 | Quach et al. | |

(Continued)

OTHER PUBLICATIONS

Energy Micro AS, "Reference Manual EFM32G Microcontroller Family," dated Sep. 6, 2010, 463 pages.

(Continued)

*Primary Examiner* — Kyle Vallecillo
(74) *Attorney, Agent, or Firm* — Seed IP Law Group LLP

(57) ABSTRACT

An apparatus having a microcontroller includes a processing unit, an internal communication bus assembly, a volatile memory, a non-volatile memory, a logic error management circuit, and two interface circuits. A first interface circuit couples the processing unit to the volatile memory via the internal communication bus assembly. A second interface circuit couples the processing unit to the non-volatile memory via the internal communication bus assembly. When the microcontroller is operating, the interface circuits are arranged to retrieve and evaluate requested data from their respective memory without intervention from the processing unit. In the event a failure is detected, the logic error management circuit is arranged to assert a stop signal. In some cases, detecting a failure includes comparing a check value stored in memory with a check value calculated from the data retrieved from memory.

19 Claims, 1 Drawing Sheet

(56) References Cited

U.S. PATENT DOCUMENTS

| | | | |
|---|---|---|---|
| 7,036,059 B1 | 4/2006 | Carmichael et al. | |
| 7,196,562 B1 * | 3/2007 | Luis | G06F 1/08 |
| | | | 327/147 |
| 2003/0002669 A1 * | 1/2003 | Miller | H04L 1/004 |
| | | | 380/46 |
| 2004/0090323 A1 | 5/2004 | Bieringer et al. | |
| 2005/0071718 A1 * | 3/2005 | Jarabek | G11C 29/42 |
| | | | 714/736 |
| 2006/0067097 A1 | 3/2006 | Lien et al. | |
| 2006/0069948 A1 | 3/2006 | Seo et al. | |
| 2007/0019805 A1 * | 1/2007 | Karpovsky | H04L 9/004 |
| | | | 380/28 |
| 2007/0180317 A1 | 8/2007 | Hirotsu et al. | |
| 2009/0183051 A1 | 7/2009 | Balb | |
| 2010/0287426 A1 | 11/2010 | Kanai et al. | |
| 2011/0022903 A1 | 1/2011 | Grimonpont et al. | |
| 2012/0110411 A1 | 5/2012 | Cheung et al. | |

OTHER PUBLICATIONS

French Search Report dated Mar. 5, 2012, for French Application No. 1155727, 6 pages.

Wikipedia, "Field-programmable gate array," retrieved from https://en.wikipedia.org/w/index.php?title=Field-programmable_gate_array, 14 pages.

* cited by examiner

MCU WITH PROCESSOR-INDEPENDENT MEMORY FAULT DETECTION

CROSS-REFERENCE TO RELATED APPLICATION

This application is a continuation of U.S. application Ser. No. 13/536,712, filed Jun. 28, 2012, which claims the benefit of Application No. FR 1155727, filed Jun. 28, 2011, each of which are incorporated herein by reference.

BACKGROUND

Technical Field

The present disclosure relates to the detection and processing of errors in a control unit. The present disclosure applies particularly to apparatuses having power circuits controlled by a control unit executing a program stored in a memory.

Description of the Related Art

Embodiments of the present disclosure can be applied to apparatuses such as household appliances, industrial systems, or medical equipment, having power circuits operating one or more electric actuators such as electric motors, solenoids, solenoid valves, etc.

Such apparatuses generally have a control unit controlling the actuators according to one or more determined sequences. The control unit, of microcontroller type for example, is connected to or includes memories having at least one non-volatile memory storing a program executed by the control unit, and one non-volatile memory enabling the program to be executed.

Some standards such as IEC 60335 and IEC 60730 direct the memories of control units of household appliances to be tested so as to trigger, in the event that a fault is detected, the execution of a procedure for stopping the power circuits, stopping the actuators in particular, and shutting down the power circuits. The memories are generally tested by the control unit which executes a test procedure as a background task of main tasks. This test procedure generally involves saving the content of a memory zone to be tested in a free zone, writing a test word in all the locations of the zone to be tested, reading the words written in the zone to be tested, comparing each word read with the test word, and restoring the original content of the memory zone before testing another zone in the memory. If an error is detected, the stop procedure is executed.

This test procedure is undesirably slow and does not enable the detection of an error in memory reading by a main task. Indeed, the memory zone being tested cannot be a memory zone used by a main task, as its content is changed by the test procedure. As a result, if a memory reading error occurs during an operation of a main task, this error can only be detected much later, when testing the memory zone in which the reading error occurred. The stop procedure will therefore only be executed well after the occurrence of the reading error. In addition, if the reading error causes a malfunction in the control unit, the test procedure and thus the stop procedure may not be executed.

Some memories of volatile type (RAM) for example associate a parity bit with each word they store, and include an interface circuit proceeding with the test of this parity bit every time a word is read to detect possible parity errors. If such a parity error is detected when reading a word, the interface circuit sends an error signal. Furthermore, some memories of non-volatile type (e.g., EEPROM or Flash) associate error-correction bits with each word they store. When reading a word, an interface circuit of these memories uses the error-correction bits to correct the word read if necessary. If the errors affecting a word read are too extensive to be corrected, the interface circuit sends an error signal.

Using this error signal to generate an exception or an interruption in the control unit has already been proposed. The interruption triggers the execution by the control unit of an interrupt routine including the procedure for stopping the power circuits. However, the execution of the interrupt routine may be disabled due to an incorrect access to a word in the memory or due to a fault in the memory in which this routine is stored. The result is that the stop procedure may not be executed in the event that an error is detected by a memory.

It is therefore desirable to be able to detect a fault in a memory in the event of a faulty access to the memory by a main task executed by the control unit. It is also desirable to trigger the execution of the procedure for stopping the power circuits as soon as a fault is detected in a memory. It is also desirable to avoid busying the resources of the control unit with storing and executing test procedures, and to avoid burdening the development tasks of the program executed by the control unit with the need to develop such test procedures.

BRIEF SUMMARY

Some embodiments relate to a method for processing faults in a control unit, the method including acts of: upon each request for reading a datum in a first memory, received by a first interface circuit for accessing the first memory, calculating by means of the first interface circuit a check word based on the datum read, if the check word calculated is different from a check word read in the memory in association with the datum read, activating an error signal by means of the first interface circuit, and sending the error signal to an output circuit of the control unit, without using any circuits of the control unit likely to send a request to access the first memory.

According to one embodiment, the method includes an act of applying a parity calculation by means of the first interface circuit to the datum read to calculate the check word.

According to one embodiment, the method includes acts of: upon each request for reading a datum in a second memory, received by a second interface circuit for accessing the second memory, detecting errors in the datum read by means of a second interface circuit for accessing the second memory, using error-correction bits read in the memory in association with the datum read, if non-correctable errors are detected in the datum read, by the second interface circuit, activating an error signal by means of the second interface circuit, and sending the error signal from the second interface circuit to the output circuit, without using any circuits of the control unit likely to send a request to access the second memory.

According to one embodiment, the output circuit receives at least one other error signal belonging to the assembly including a control unit power supply error signal, a comparison signal for comparing an input signal of the control unit with a threshold, a hardware error signal, an emergency stop manual trigger signal, and a system clock error signal of the control unit.

According to one embodiment, each error signal is sent to the output circuit if it is not masked by a masking circuit.

According to one embodiment, the method includes acts of initializing the masking circuit to an unmasked state in which each error signal is sent to the output circuit, of masking an error signal, and of prohibiting the unmasking of an error signal to send again an error signal that was masked.

According to one embodiment, the method includes an act of executing by means of the output circuit a procedure for stopping power circuits that are linked to the output circuit, triggered by the output circuit receiving an error signal.

Some embodiments also relate to a control unit having a first interface circuit for accessing a first memory, at least one circuit likely to send a request to access the first memory, and an output circuit, the control unit being configured to implement the method as described above.

According to one embodiment, the first memory is a volatile memory.

According to one embodiment, the control unit includes a second interface circuit for accessing a second memory.

According to one embodiment, the second memory is a non-volatile memory.

According to one embodiment, the circuits of the control unit, likely to send a request to access the first or the second memory, include a processing unit and possibly at least one transfer circuit for transferring data blocks to or from a memory.

According to one embodiment, the control unit includes an error signal masking circuit configured to send only unmasked error signals to the output circuit.

According to one embodiment, the masking circuit is configured to receive at least one other error signal belonging to the assembly including a control unit power supply error signal, a comparison signal for comparing an input signal of the control unit with a threshold, a hardware error signal, an emergency stop manual trigger signal, and a system clock error signal of the control unit.

Some embodiments also relate to an apparatus having power circuits and a control unit as defined above, the output circuit (OLC) of the control unit being linked to the power circuits.

According to one embodiment, the output circuit is linked to the power circuits through power switches controlled by the output circuit, the output circuit being configured to execute a procedure for stopping the power circuits upon receiving each error signal.

BRIEF DESCRIPTION OF THE SEVERAL VIEWS OF THE DRAWINGS

Some examples of embodiments of the present disclosure will be described below in relation with, but not limited to, the following figures.

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings. One or more embodiments are described hereinafter with reference to the accompanying drawings in which.

DETAILED DESCRIPTION

Figure 1:
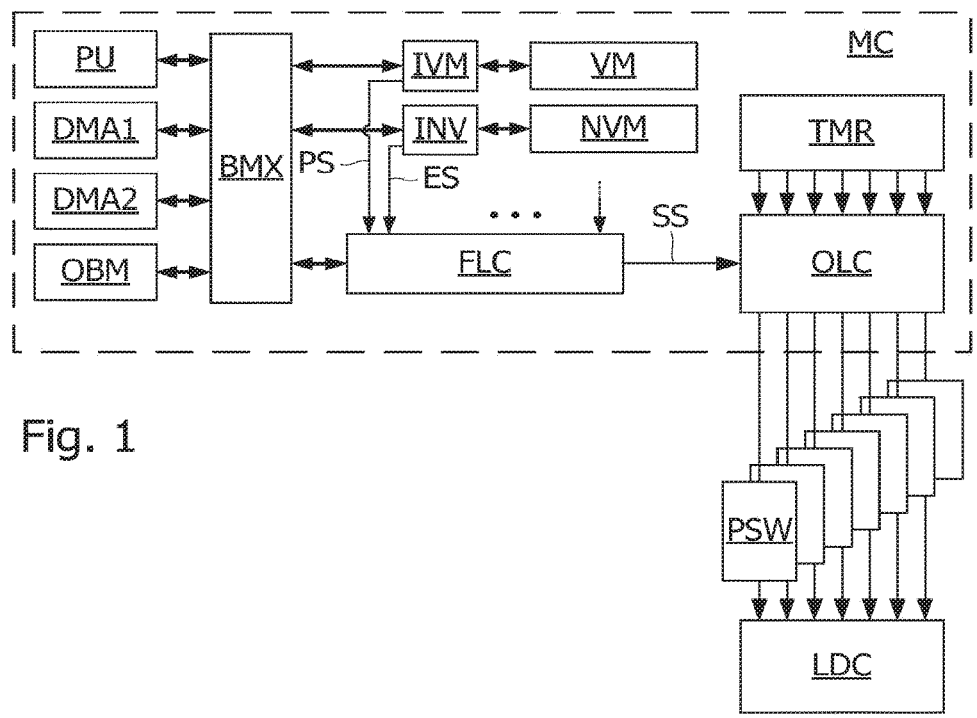
FIG. 1 represents circuits of an apparatus having a control unit and power circuits, according to one embodiment.

FIG. 1 represents circuits of an apparatus such as a household appliance. The circuits represented in FIG. 1 include a control unit MC, power switches PSW controlled by the unit MC, and power circuits LDC connected to the switches PSW. The unit MC includes a processing unit PU and a bus interconnection matrix BMX connected to the unit PU. The unit MC may also include particularly one or more data block transfer circuits DMA1, DMA2 for transferring data blocks to or from a memory, connected to the matrix BMX, and other circuits OBM which can request access to the matrix BMX. The unit MC also includes a volatile memory VM, for example of RAM type, and a non-volatile memory NVM, for example of EEPROM or Flash type. The memory VM is linked to the bus BMX through an interface circuit IVM carrying out a parity check in particular. The memory NVM is linked to the bus BMX through an interface circuit INV particularly performing functions of detecting and correcting errors in the words read in the memory.

The unit MC may be a microcontroller or a microprocessor. The memories NV, NVM may be internal or external to the unit MC. The power switches PSW include for example Insulated Gate Bipolar Transistors (IGBT).

The circuit IVM is configured to calculate a check sum of CRC type (Cyclic Redundancy Check) for checking a word read in the memory VM and to compare the check sum calculated with a check sum stored in the memory VM in association with the word read. If the check sum calculated does not correspond to the one read in the memory VM in association with the word read, the circuit IVM activates the error signal PS. The check sum is for example a parity calculation and supplies a result on one so-called "parity" bit. In this example, each word stored in the memory VM is thus associated with a parity bit.

The circuit INV is configured to implement an error detection and correction algorithm, for example an algorithm based on Hamming codes. Each word stored in the memory NVM is associated with several parity bits the number of which is chosen according to the number of errors in a word likely to be corrected and to the number of errors likely to be detected. If the circuit INV detects errors on a word read that it is not able to correct, it activates an error signal ES.

The control unit MC also includes timers TMR generating timing signals or Pulse Width Modulation signals (PWM), and a logic control circuit OLC receiving output signals from the circuits TMR. The circuit OLC includes outputs each connected to a control input of one of the power switches PSW. The circuit OLC controls the switches PSW according to predetermined sequences paced using the signals from the timers TMR.

According to one embodiment, each of the error signals sent by the circuits IVM and INV is sent to a logic error management circuit FLC which can further receive error signals sent by other circuits (not illustrated) in the unit MC. The circuit FLC is connected at output to an input of the circuit OLC provided for receiving a stop signal SS which controls the execution of stop sequences controlling the switches PSW to appropriately stop the various actuators of the power circuits LDC, and shut down the power supply of the power circuits. The circuit FLC is configured to activate the stop signal SS, upon receiving an active error signal, and possibly to mask certain error signals so that they do not trigger the stop procedure.

Figure 2:
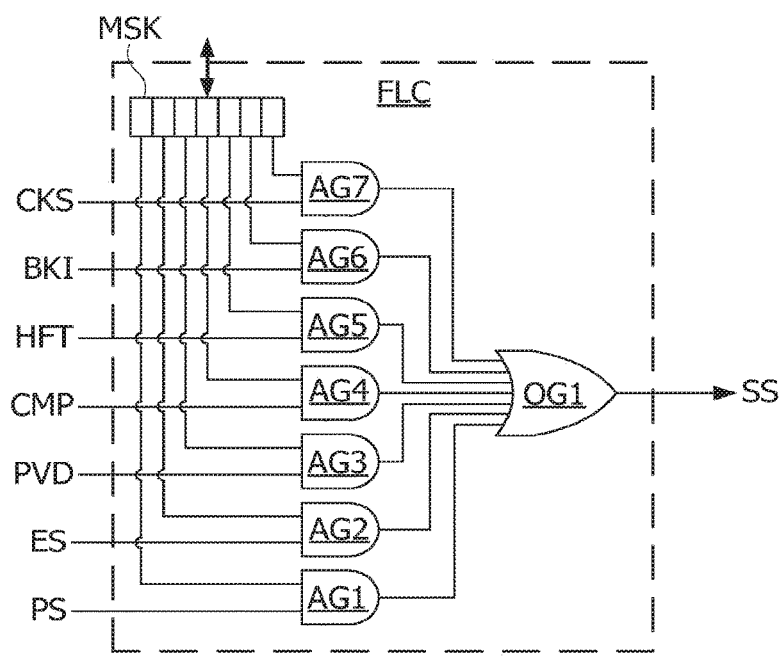
FIG. 2 represents a circuit of the control unit, according to one embodiment.

FIG. 2 represents the logic circuit FLC according to one embodiment. The circuit FLC includes a masking register MSK, several AND-type logic gates AG1-AG7, and one OR-type logic gate OG1. Each gate AG1-AG7 receives at an input a respective bit of a cell of the register MSK and at another input one of the error signals supplied at input of the circuit FLC. The output of each gate AG1-AG7 is connected at output to a respective input of the gate OG1. The output of the gate OG1 supplies the stop signal SS controlling the circuit OLC. Each cell of the register MSK can thus take either a masked state (on 0 in the example in FIG. 2), or an unmasked state (on 1) authorizing the error signal associated by one of the gates AG1-AG7 with the cell to cause the activation of the stop signal SS and thus the execution of the stop sequence by the circuit OLC. The register MSK can be connected to the bus BMX to be write-accessible particularly by the unit PU. The error signals include the signals PS, ES supplied by the circuits IVM and INV and may also include particularly an error signal PVD coming from a power supply supervision circuit in the unit MC, signals CMP coming from comparators provided to compare input signals of the unit MC with thresholds, hardware error signals HFT, an emergency stop manual trigger signal BKI, and a system clock error signal CKS of the unit MC. When the signal SS is active, it thus corresponds to at least one active and unmasked error signal.

Therefore, each cell of the register MSK in the masked state prevents the execution of the stop sequence by the circuit OLC when the associated error signal becomes active. The register MSK can be write-protected so as to authorize only each of its cells to change to the masked state, and thus prohibit their changing to the unmasked state. Each cell of the register MSK can be initialized to the unmasked state when initializing the unit MC, then loaded by a masking word read in the memory NVM by a start-up procedure of the unit MC, executed for example by the unit PU. The program executed by the unit MC may then only change the cells of the register MSK to the masked state.

It will be understood by those skilled in the art that various alternative embodiments and various applications of the present invention are possible. In particular, the present invention is not limited to the circuits described herein and also, for example, covers a control unit connected to external memories. In addition, the control unit does not necessarily include a masking circuit. Indeed, in certain applications it may not be necessary to mask the error signals. Furthermore, the control unit is not necessarily linked to power circuits.

Moreover, the check of the parity of data read in a memory is not necessarily performed on a volatile memory, but may naturally be performed on a non-volatile memory. The error detection and correction operations can also be performed on a volatile memory.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microcontroller unit (MCU), comprising:
a processing unit;
an internal communication bus assembly;
a volatile memory;
a first interface circuit coupling the processing unit to the volatile memory via the internal communication bus assembly, the first interface circuit arranged to, when the MCU is operating, retrieve and evaluate requested volatile data from the volatile memory without intervention from the processing unit, said first interface circuit further including circuitry to:
retrieve the requested volatile data from a determined location in the volatile memory;
retrieve a first check word associated with the determined location;
calculate a second check word based on the requested volatile data retrieved from the determined location in the volatile memory;
evaluate the first check word relative to the second check word to determine whether the requested volatile data retrieved from the determined location in the volatile memory is valid or invalid; and
assert a first error signal based on a determination that the requested volatile data retrieved from the determined location in the volatile memory is invalid;
a non-volatile memory;
a second interface circuit coupling the processing unit to the non-volatile memory via the internal communication bus assembly, the second interface circuit arranged to, when the MCU is operating, retrieve and evaluate requested non-volatile data from the non-volatile memory without intervention from the processing unit, the second interface circuit further arranged to assert a second error signal upon a failure detected during said retrieval and evaluation of the requested non-volatile data; and
a logic error management circuit coupled to the first and second interface circuits and arranged to pass a stop signal upon assertion of at least one of the first and second error signals.

2. A microcontroller unit (MCU) according to claim 1, comprising:
a first direct memory access (DMA) controller; and
a second direct memory access (DMA) controller, wherein the processing unit, and the first and second DMA controllers are arranged to request data from both the volatile memory and the non-volatile memory.

3. A microcontroller unit (MCU) according to claim 1, wherein the logic error management circuit comprises:
a plurality of gating circuits, wherein individual ones of the plurality of gating circuits are arranged to pass the first error signal, the second error signal, a clock error signal, and a hardware error signal.

4. A microcontroller unit (MCU) according to claim 3 wherein at least one of the plurality of gating circuits is arranged to pass a manually triggered stop signal.

5. A microcontroller unit (MCU) according to claim 3, wherein the logic error management circuit comprises:
a masking structure, the masking structure arranged to selectively permit or deny passage of signaling information through any of the plurality of gating circuits.

6. A microcontroller unit (MCU) according to claim 5 wherein the processing unit is arranged to control the masking structure.

7. A microcontroller unit (MCU) according to claim 1 wherein the stop signal is arranged for output without any intervention from processing unit.

8. A microcontroller unit (MCU) according to claim 7, comprising:
an output logic circuit arranged to direct a halt of any processing by the processing unit when the stop signal is asserted.

9. A microcontroller unit (MCU) according to claim 1 wherein the circuitry for calculation of the second check word is arranged to calculate a checksum value.

10. A microcontroller unit (MCU) according to claim 9 wherein the circuitry for calculation of the second check word arranged to calculate the checksum is further arranged to provide at least one parity bit.

11. A microcontroller unit (MCU) according to claim 1, wherein the second interface circuit comprises circuitry to:
generate a parity signal;
correct errors in the retrieved non-volatile data; and
assert the second error signal if the retrieved non-volatile data includes uncorrectable errors.

12. A microcontroller unit (MCU) according to claim 1, wherein the second interface circuit comprises circuitry to:
generate at least one Hamming code;
correct errors in the retrieved non-volatile data based on the at least one Hamming code; and
assert the second error signal if the retrieved non-volatile data includes uncorrectable errors.

13. A method, comprising:
initializing a processing unit;
passing a request for volatile data from the processing unit through an internal communication bus assembly to a first interface circuit;
with the first interface circuit, and in the absence of any intervention by the processing unit:
 retrieving the requested volatile data from a determined location in a volatile memory coupled to the first interface circuit;
 retrieving a first check value associated with the volatile data stored at the determined location;
 calculating a second check value based on the requested volatile data retrieved from the determined location in the volatile memory;
 evaluating the first check value relative to the second check value to determine whether the requested volatile data retrieved from the determined location in the volatile memory is valid or invalid; and
 when the requested volatile data retrieved from the determined location in the volatile memory is determined to be invalid, asserting a first error signal;
passing a request for non-volatile data through the internal communication bus assembly to a second interface circuit;
with the second interface circuit, and in the absence of any intervention by the processing unit, retrieving and evaluating the requested non-volatile data from a non-volatile memory coupled to the second interface circuit;
with the second interface circuit, asserting a second error signal when a failure is detected during said retrieving and evaluating of the requested non-volatile data; and
with a logic error management circuit coupled to the first and second interface circuits and upon assertion of at least one of the first and second error signals, passing a stop signal that will halt operations of the processing unit.

14. A method according to claim 13, wherein said retrieving and evaluating the requested non-volatile data comprises:
generating an error correction signal;
correct errors in the retrieved non-volatile data using the error correction signal; and
asserting the second error signal when the retrieved non-volatile data includes uncorrectable errors.

15. A method according to claim 13, comprising:
operating an appliance at least in part by executing instructions with the processing unit.

16. An apparatus, comprising:
a volatile memory;
a non-volatile memory;
a logic error management circuit arranged to pass a stop signal upon assertion of at least one of a first signal and a second error signal;
an output logic circuit arranged to direct a stoppage of processing unit operations when the stop signal is passed; and
a microcontroller unit (MCU) having the processing unit, an internal communication bus framework, a first interface circuit, and a second interface circuit,
wherein the first interface circuit is coupled to the volatile memory and coupled to the processing unit via the internal communication bus framework, the first interface circuit arranged to, when the MCU is operating, retrieve and evaluate requested volatile data from the volatile memory without intervention from the processing unit, the first interface circuit further arranged to generate the first error signal upon a failure detected during said retrieval and evaluation of the volatile data, and
wherein a second interface circuit is coupled to the non-volatile memory and coupled to the processing unit via the internal communication bus framework, the second interface circuit arranged to, when the MCU is operating, retrieve and evaluate requested non-volatile data from the non-volatile memory without intervention from the processing unit, the second interface circuit further arranged to generate the second error signal upon a failure detected during said retrieval and evaluation of the non-volatile data.

17. An apparatus according to claim 16 wherein at least one of the volatile memory and the non-volatile memory are integrated with the MCU.

18. An apparatus according to claim 16, comprising:
at least one direct memory access (DMA) controller integrated with the MCU and arranged to generate requests for data from at least one of the volatile memory and the non-volatile memory.

19. An apparatus according to claim 16 wherein the stoppage of processing unit operations includes removing power from at least one circuit of the apparatus.

* * * * *